Patented Nov. 14, 1944

2,362,882

UNITED STATES PATENT OFFICE 2,362,882

DETERGENT AND METHOD OF PRODUCTION

William F. Carson, Jr., Brunswick, Ga., assignor to Hercules Powder Company, Wilmington, Del., a corporation of Delaware No Drawing. Application July 18, 1942, Serial No. 451,507

2 Claims. (Cl. 260—105)

This invention relates to sulfated pentaerythritol derivatives and to a method for their production.

Many sulfated and sulfonated organic compounds are known and are widely used because they possess high wetting, penetrating, emulsifying, detergent, dispersing, foaming, and related properties. Because of these properties, such sulfated and sulfonated materials are used in the arts of dyeing, cleansing, and otherwise treating textile fibers, leather, etc., in the wet state. These products are also used in insecticides and froth flotation processes, in lubricants and in other applications in which wetting, emulsifying, detergent, etc., agents have been found suitable.

Now, in accordance with this invention, novel sulfation products which have a very high detergent value, wetting power and other desirable properties are provided. These materials are salts of a sulfation product of a pentaerythritol ester of an organic carboxylic acid having at least twelve carbon atoms, the ester having at least one free hydroxyl group in the molecule. Such detergent products are prepared in accordance with the method of this invention by contacting a sulfating agent and the aforementioned pentaerythritol ester under conditions adapted to produce a sulfation product of the ester, after which the ester is contacted with a basic substance to produce a salt. Thus, by employing the method of this invention, there are provided novel sulfation products which are highly desirable because of their detergent, wetting, and other useful properties.

Having thus indicated in a general way the nature of this invention, the following examples are included to illustrate the preparation of the novel sulfation products. In the specification and in the claims, the parts and percentages are by weight unless otherwise indicated.

Example 1

With stirring, 15 parts of commercial grade pentaerythritol and 100 parts of N wood rosin, having an acid number of 165, were heated at 295° C. for 9 hours under a carbon dioxide atmosphere. The ester formed was then sparged at 295° C. for 1 hour with carbon dioxide to yield a product having an acid number of 15. Two hundred parts of this ester were dissolved in 950 parts of dry carbon tetrachloride, after which the mixture was cooled to 10° C. and treated in a dropwise manner with 25 parts of chlorosulfonic acid. The mixture was efficiently stirred during the addition of the sulfating agent. After 1 hour, the solution was sparged with carbon dioxide to remove dissolved hydrogen chloride, neutralized at 10° C. with 15% aqueous sodium hydroxide, and then evaporated to dryness. The product obtained was a light yellow solid, which was soluble in water and partially soluble in ethyl alcohol and possessed excellent detergent action.

Example 2

Employing the procedure outlined in Example 1, an ester having an acid number of 8 was prepared by reacting 22.5 parts of commercial grade pentaerythritol and 100 parts of the same N wood rosin employed in Example 1. According to the procedure of Example 1, 200 parts of this diester were sulfated at 10° C. with 50 parts of chlorosulfonic acid while dissolved in 950 parts of dry carbon tetrachloride. As in Example 1, the solution was sparged with carbon dioxide to remove dissolved hydrogen chloride, neutralized with 15% aqueous sodium hydroxide at 10° C. and evaporated to dryness. The product was a light yellow solid, which was soluble in water and partly soluble in ethyl alcohol, and which possessed good detergent action.

Example 3

Employing the procedure of Example 1, 45 parts of commercial grade pentaerythritol were reacted with 100 parts of the N wood rosin used in Example 1 to produce an ester having an acid number of 7. Two hundred parts of this monoester, dissolved in 950 parts of dry carbon tetrachloride, were sulfated by the procedure of Example 1 with 150 parts of chlorosulfonic acid. As in Example 1, the solution was sparged with carbon dioxide to remove dissolved hydrogen chloride, neutralized with 15% aqueous sodium hydroxide at 10° C., and evaporated to dryness. This product also was a light yellow solid, which was soluble in water, partly soluble in ethyl alcohol and possessed good detergent action.

Example 4

Using a procedure similar to that of Example 1, 852 parts by weight of stearic acid were heated with 204 parts of commercial grade pentaerythritol at 215° C. A diester having an acid number of 14 was thus obtained. Two hundred parts of this diester, dissolved in 950 parts of dry carbon tetrachloride, were sulfated by the procedure of Example 1 employing 30 parts of chlorosulfonic acid. After the sulfation had been completed, the solution was sparged with carbon dioxide to remove dissolved hydrogen chloride, neutralized with 15% aqueous sodium hydroxide at 10° C., and evaporated to dryness. The product obtained was somewhat lighter in color than those obtained in the preceding examples, but the product prepared in this example also possessed excellent detergent qualities.

*Example 5*

Employing a procedure similar to that of Example 1, 565 parts of stearic acid were heated with 272 parts of commercial pentaerythritol at 240° C. for 4 hours to produce an ester having an acid number of 0.2. Five hundred parts of this monoester, dissolved in 1380 parts of dry carbon tetrachloride, were sulfated by the procedure of Example 1 employing 511 parts of chlorosulfonic acid. After the sulfation was completed, the solution was sparged with carbon dioxide to remove dissolved hydrogen chloride, neutralized with 15% aqueous sodium hydroxide at 10° C., and evaporated to dryness. The product was a light brown, free-flowing powder, which was soluble in water and possessed excellent detergent action.

The above examples illustrate the preparation of the novel pentaerythritol derivatives of this invention by reacting a sulfating agent and a pentaerythritol ester of an organic carboxylic acid having at least twelve carbon atoms, the ester having at least one free hydroxyl group in the molecule, and then forming a salt of this sulfation product.

The sulfated products of this invention may be prepared from any pentaerythritol ester of an organic carboxylic acid having at least twelve carbon atoms, provided the ester has at least one free hydroxyl group in the molecule. Thus, a suitable ester may be obtained using any rosin or modified rosin as the acid constituent of the ester. Hence, in addition to the N wood rosin and stearic acid shown in the examples, there may be used any wood or gum rosin, or the rosin acids obtainable therefrom, such as abietic acid, pimaric acid, sapinic acid, etc.; modified rosins, such as hydrogenated rosin; rosins which have been disproportionated with the aid of hydrogenation catalysts such as platinum, palladium, etc., as described, for example, in U. S. Patent 2,154,629 to Littmann; rosins which have been polymerized by means of any of the known polymerization catalysts such as sulfuric acid, boron fluoride, zinc chloride, etc., to effect a substantial increase in the melting point of the rosin, for example, as is described in U. S. Patent 2,017,866 to Morton; heat treated rosins which have been heat treated at 250–325° C. for a period of time sufficient to effect substantial isomerization of the rosin, etc. The fatty acids having at least twelve atoms, such as lauric, myristic, palmitic, oleic, linoleic, linolenic, etc., acids are also suitable for use in the preparation of pentaerythritol esters which may be sulfated to yield the products of this invention.

The pentaerythritol esters which may be sulfated in accordance with the method of this invention may be prepared by esterification procedures well known in the art to produce an ester having at least one free hydroxyl group in the molecule. When it is desired to prepare a pentaerythritol ester of a rosin or modified rosin, the pentaerythritol is heated under inert conditions, preferably at about 295° C., with the proper stoichiometric quantity of rosin or modified rosin, depending upon the number of free hydroxyl groups desired in the ester generally, for a period of about 9 hours. If an ester of a fatty acid is desired, the pentaerythritol and fatty acid are generally reacted at about 215° C. for about 3 hours.

Any of the sulfating agents generally employed in the art may be used in the preparation of the detergent and wetting agents of this invention. In the examples, the sulfating agent employed was chlorosulfonic acid, but in its place there may be used concentrated sulfuric acid, oleum, sulfur trioxide, etc. The sulfation is preferably conducted with the ester dissolved in an organic solvent which is inert under the reaction conditions. As such, there may be employed, in place of the carbon tetrachloride shown in the examples, the paraffin hydrocarbons such as hexane, heptane, etc.; the chlorinated paraffin hydrocarbons such as ethylene dichloride, tetrachloroethane, etc. In the examples, the sulfation was effected at 10° C., but generally any temperature between about −10 and about 60° C. and preferably from about 0 to about 30° C. may be employed. The time required for conducting the sulfation procedure may vary within wide limits and will depend upon the particular ester being sulfated, upon the solvent employed, upon the concentration of the ester in the solvent, upon the specific sulfating agent and its concentration, upon the temperature at which the sulfation process is conducted, and upon other obvious factors. At the completion of the sulfation, the sulfated ester may be isolated by evaporation of the solvent and then sparged with an inert gas, such as carbon dioxide, to produce a pure product.

The sulfated ester may be prepared into a salt by contacting it under proper conditions with a basic substance. In the examples, the salt was prepared by reacting the sulfated ester with sodium hydroxide, but in its place there may be used potassium hydroxide, ammonium hydroxide, sodium carbonate, sodium bicarbonate, potassium carbonate, organic amines such as methylamine, dimethylamine, morpholine, etc. The salt may be recovered by any convenient method, such as the evaporation procedure shown in the examples. If desired, the product may be further purified by dissolving it in ethyl alcohol, filtering the solution, and then evaporating it to dryness.

The products prepared as described herein are characterized by their high detergent, emulsifying, dispersing, frothing, and wetting action. Hence, they may be employed as such as detergents, or in combination with fatty acid soaps. Their detergent action in hard water makes them particularly useful as soaps in hard water districts.

What I claim and desire to protect by Letters Patent is:

1. A salt selected from the group consisting of alkali metal, ammonium, and amine salts of a sulfation product of a pentaerythritol ester of a hydrogenated rosin, said ester having at least one free hydroxyl group in the molecule.

2. A sodium salt of a sulfation product of a pentaerythritol ester of a hydrogenated rosin, said ester having at least one free hydroxyl group in the molecule.

WILLIAM F. CARSON, Jr.